United States Patent [19]

Reagen et al.

[11] Patent Number: 5,399,539
[45] Date of Patent: Mar. 21, 1995

[54] POLYMERIZATION CATALYSTS AND PROCESSES

[75] Inventors: William K. Reagen, Stillwater, Minn.; Ted M. Pettijohn, Bartlesville, Okla.

[73] Assignee: Phillips Petroleum Company, Bartlesville, Okla.

[21] Appl. No.: 265,572

[22] Filed: Jun. 24, 1994

Related U.S. Application Data

[60] Division of Ser. No. 217,469, Mar. 24, 1994, Pat. No. 5,360,879, which is a division of Ser. No. 23,746, Feb. 26, 1993, Pat. No. 5,340,785, which is a continuation of Ser. No. 809,777, Dec. 18, 1991, abandoned.

[51] Int. Cl.$^6$ .................................................. C08F 4/24
[52] U.S. Cl. ...................................... 502/107; 502/62; 502/108; 502/117; 502/120; 502/123; 526/100; 526/141
[58] Field of Search ............... 502/62, 107, 108, 117, 502/120, 123

[56] References Cited

U.S. PATENT DOCUMENTS

| | | | |
|---|---|---|---|
| 3,100,764 | 8/1963 | Jezl et al. | 260/93.7 |
| 3,231,550 | 1/1966 | Manyik et al. | 260/88.2 |
| 3,242,099 | 3/1966 | Manyik et al. | 252/429 |
| 3,300,458 | 1/1967 | Manyik et al. | 260/88.2 |
| 3,347,840 | 10/1967 | Manyik et al. | 260/94.9 |
| 3,534,006 | 10/1970 | Kamaisha et al. | 260/80.18 |
| 3,887,494 | 6/1975 | Dietz et al. | 252/452 |
| 3,900,457 | 8/1975 | Witt | 260/94.9 |
| 4,053,436 | 10/1977 | Hogan et al. | 252/452 |
| 4,151,122 | 4/1979 | McDaniel et al. | 252/458 |
| 4,294,724 | 10/1981 | McDaniel | 252/451 |
| 4,392,990 | 7/1983 | Witt | 252/458 |
| 4,444,964 | 4/1984 | McDaniel et al. | 526/106 |
| 4,634,687 | 1/1987 | Fujita et al. | 502/121 |
| 4,668,838 | 5/1987 | Briggs | 585/513 |
| 4,688,838 | 5/1987 | Briggs | 585/583 |
| 4,716,206 | 12/1987 | Fujita et al. | 526/124 |
| 4,721,762 | 1/1988 | Commereuc et al. | 526/75 |
| 4,735,931 | 4/1988 | McDaniel et al. | 526/106 |
| 4,806,513 | 2/1989 | McDaniel et al. | 502/107 |
| 4,814,308 | 3/1989 | Konrad et al. | 502/107 |
| 4,988,657 | 1/1991 | Martin et al. | 502/158 |

FOREIGN PATENT DOCUMENTS 2253029  6/1975  France.

OTHER PUBLICATIONS

ACS Preprints, Symposia on Novel Preparation and Conversion of Light Olefin (Reagen, Aug. 1989).

J. Chem. Soc., Chem. Commun., Selective Trimeriztion of Ethylene to Hex-1-ene, pp. 674-675 (J. Briggs, 1989).

Zeitschrift fur Naturforschung, Pyrrolylchromium Compounds, 21-b, p. 1239 (D. Tille, 1966).

Z. Anorg. Alleg. Che., Organometal Compounds of Nitrogen Systems, 384, pp. 136-146 (D. Tille, 1971).

Kresser, Theodore O. J.; Polyolefin Plastics (1969) pp. 3-6.

Billmeyer, Jr., Fred W.; Textbook of Polymer Science (1984) pp. 91, 92 and 96.

Boor, Jr., John; Ziegler-Natta Catalysts and Polymerizations (1979) pp. 279-284.

Schut, Jan H.; Plastics Technology "Why Processors Need to Know How They Make PEs" (Sep. 1993) pp. 68-72.

Primary Examiner—Joseph L. Schofer
Assistant Examiner—David Wu
Attorney, Agent, or Firm—Lynda S. Jolly

[57] ABSTRACT

Supported olefin polymerization catalyst systems can be produced using waste chromium compounds. Olefin polymers can be prepared using a catalyst system composition comprising a waste chromium compound and an alkyl aluminum compound, both supported on an inorganic oxide support, wherein at least a portion of the waste chromium compound is in a hexavalent state.

19 Claims, No Drawings

POLYMERIZATION CATALYSTS AND PROCESSES

This application is a division of application Ser. No. 08/217,469, filed Mar. 24, 1994, now U.S. Pat. No. 5,360,879, which is a division of application Ser. No. 08/023,746, filed Feb. 26, 1993, now U.S. Pat. No. 5,340,785, which is a file wrapper continuation of application Ser. No. 07/809,777, filed Dec. 18, 1991, now abandoned.

BACKGROUND

This invention relates to olefin polymerization, polymerization catalyst systems, and processes to prepare polymerization catalyst systems.

Supported chromium catalysts have long been a dominant factor in the production of olefin polymers, such as polyethylene. Chromium-containing compounds, either supported or unsupported, can also be used to oligomerize olefins. Unfortunately, the production of chromium-containing compounds for use in catalyst systems, usually results in some waste product which contains chromium compounds. Chromium-containing compounds are and have been considered environmental and animal toxins for the past several decades. Therefore, elimination, reduction, or utilization of recyclable chromium-containing compounds is desirable.

SUMMARY OF THE INVENTION

Therefore, it is an object of this invention to provide a process to recycle chromium-containing compounds.

It is a further object of this invention to provide novel polymerization catalyst systems.

It is yet another object of this invention to provide a novel process for preparing supported olefin polymerization catalyst systems.

It is still a further object of this invention to provide novel olefin polymerization processes.

In accordance with one embodiment of this invention, previously used, such as, for example, spent, chromium compounds comprising a chromium source, a pyrrole-containing compound, a metal alkyl and an unsaturated hydrocarbon are supported on an inorganic oxide support. The resultant, supported chromium compound is calcined to produce an active polymerization catalyst system, wherein at least a portion of the chromium compound is in a hexavalent state. In accordance with the second embodiment of this invention, previously used, such as, for example, spent, inorganic oxide supported chromium pyrrolide-based catalyst and/or waste systems can be calcined to produce an active polymerization catalyst system. Optionally, the previously used, supported chromium pyrrolide can be re-contacted, i.e., re-impregnated, with additional chromium compound prior to calcination.

In accordance with still another embodiment of the invention, these novel catalyst system compositions can be used to polymerize olefins.

DETAILED DESCRIPTION OF THE INVENTION

Supports

Catalyst supports useful in this invention can be any conventional polymerization catalyst support. Preferably, the catalyst support comprises a zeolite or one or more refractory metal inorganic oxides. Exemplary refractory metal inorganic oxide catalyst supports include, but are not limited to, inorganic oxides, either alone or in combination, phosphated inorganic oxides and mixtures thereof. Particularly preferred inorganic oxide supports are selected from the group consisting of silica, silica-alumina, alumina, fluorided alumina, silated alumina, thoria, aluminophosphate, aluminum phosphate, phosphated silica, phosphated alumina, silica-titania, preprecipitated silica/titania, fluorided/silated alumina and mixtures thereof. Furthermore, any one or more of these supports can contain chromium. As used in this disclosure, the term "support" is not necessarily limited to a catalytically inert material. It is possible that the support can contribute to the activity of the entire catalyst system.

The catalyst supports can be prepared in accordance with any method known in the art. Exemplary support method preparations are given in U.S. Pat. Nos. 3,887,494; 3,900,457; 4,053,346; 4,294,724; 4,392,990; 4,405,501; and 4,364,855, hereinafter incorporated by reference. Presently, the most preferred catalyst support, because of the greatest catalytic activity and selectivity, is aluminophosphate, as disclosed in U.S. Pat. No. 4,364,855 (1982).

Chromium Compounds

Waste chromium compounds, prepared in accordance with one embodiment of this invention, which previously have been used, comprise a chromium source, a pyrrole-containing compound and a metal alkyl, which have been contacted and/or reacted in the presence of an unsaturated hydrocarbon. Such compounds can have usefulness for other purposes and, as used in this disclosure, after these chromium compounds have been used at least once, for another purpose, these chromium compounds are considered waste chromium compounds. The chromium source can be one or more inorganic compounds, wherein the chromium oxidation state is from 0 to 6. Generally, the chromium source will have a formula of $CrX_n$, wherein X can be the same or different and can be any organic or inorganic radical, and n is an integer from 1 to 6. Exemplary organic radicals can have from about 1 to about 20 carbon atoms per radical, and are selected from the group consisting of alkyl, alkoxy, ester, ketone, and/or amido radicals. The organic radicals can be straight-chained or branched, cyclic or acyclic, aromatic or aliphatic, can be made of mixed aliphatic, aromatic, and/or cycloaliphatic groups. Exemplary inorganic radicals include, but are not limited to halides, sulfates, and/or oxides.

Preferably, the chromium source is a chromium(II)- and/or chromium(III)-containing compound which can yield a catalyst system with improved polymerization activity. Most preferably, the chromium source is a chromium(III) compound because of ease of use, availability, and enhanced catalyst system activity. Exemplary chromium(III) compounds include, but are not limited to, chromium carboxylates, chromium naphthenates, chromium halides, chromium pyrrolides, and/or chromium dionates. Specific exemplary chromium(III) compounds include, but are not limited to, chromium(III) 2,2,6,6,-tetramethylheptanedionate [Cr(TMHD)$_3$], chromium(III) 2-ethylhexanoate [Cr(EH)$_3$], chromium(III) naphthenate [Cr(Np)$_3$], chromium(III) chloride, chromium(III) tris(2-ethylhexanoate), chromic bromide, chromic chloride, chromic fluoride, chromium(III) oxy-2-ethylhexanoate, chromium(III) dichloroethylhexanoate, chromium(III) acetylacetonate, chromium(III) acetate, chromium(III) butyrate, chromium(III) neopentanoate, chromium(III) laurate, chromium(III) stearate, chromium (III) pyrrolides and/or chromium(III) oxalate.

Specific exemplary chromium(II) compounds include, but are not limited to, chromous bromide, chromous fluoride, chromous chloride, chromium(II) bis(2-ethylhexanoate), chromium(II) acetate, chromium(II) butyrate, chromium(II) neopentanoate, chromium(II) laurate, chromium(II) stearate, chromium(II) oxalate and/or chromium(II) pyrrolides.

The pyrrole-containing compound can be any pyrrole-containing compound that will react with a chromium source to form a chromium pyrrolide complex. As used in this disclosure, the term "pyrrole-containing-compound" refers to hydrogen pyrrolide, i.e., pyrrole, ($C_4H_4N$ or $C_4H_4NH$), derivatives of hydrogen pyrrolide, substituted pyrrolides, as well as metal pyrrolide complexes. A "pyrrolide" is defined as a compound comprising a 5-membered, nitrogen-containing heterocycle, such as for example, pyrrole, derivatives of pyrrole, and mixtures thereof. Broadly, the pyrrole-containing compound can be pyrrole and/or any heteroleptic or homoleptic metal complex or salt, containing a pyrrolide radical, or ligand. The pyrrole-containing compound can be either affirmatively added to the reaction, or generated in-situ.

Generally, the pyrrole-containing compound will have from about 1 to about 20 carbon atoms per molecule. Exemplary pyrrolides are selected from the group consisting of hydrogen pyrrolide (pyrrole), lithium pyrrolide, sodium pyrrolide, potassium pyrrolide, cesium pyrrolide, and/or the salts of substituted pyrrolides, because of high reactivity and activity with the other reactants. Examples of substituted pyrrolides include, but are not limited to, pyrrole-2-carboxylic acid, 2-acetylpyrrole, pyrrole-2-carboxaldehyde, tetrahydroindole, 2,5-dimethylpyrrole, 2,4-dimethyl-3-ethylpyrrole, 3-acetyl-2,4-dimethylpyrrole, ethyl-2,4-dimethyl-5-(ethoxycarbonyl)-3-pyrrole-proprionate, ethyl-3,5-dimethyl-2-pyrrolecarboxylate. When the pyrrole-containing compound contains chromium, the resultant chromium compound can be called a chromium pyrrolide.

The most preferred pyrrole-containing compounds used in a trimerization catalyst system, prepared in accordance with this invention, are selected from the group consisting of hydrogen pyrrolide, i.e., pyrrole ($C_4H_5N$), 2,5-dimethylpyrrole and/or chromium pyrrolides. Optionally, for ease of use, a chromium pyrrolide can provide both the chromium source and the pyrrole-containing compound. As used in this disclosure, when a chromium pyrrolide is used to form a catalyst system, a chromium pyrrolide is considered to provide both the chromium source and the pyrrole-containing compound. While all pyrrole-containing compounds can produce catalyst systems with high activity and productivity, use of pyrrole and/or 2,5-dimethylpyrrole can produce a catalyst system with enhanced activity and selectivity to a desired product.

The metal alkyl can be any heteroleptic or homoleptic metal alkyl compound. One or more metal alkyls can be used. The alkyl ligand(s) on the metal can be aliphatic and/or aromatic. Preferably, the alkyl ligand(s) are any saturated or unsaturated aliphatic radical. The metal alkyl can have any number of carbon atoms. However, due to commercial availability and ease of use, the metal alkyl will usually comprise less than about 70 carbon atoms per metal alkyl molecule and preferably less than about 20 carbon atoms per molecule. Exemplary metal alkyls include, but are not limited to, alkylaluminum compounds, alkylboron compounds, alkylmagnesium compounds, alkylzinc compounds and/or alkyl lithium compounds. Exemplary metal alkyls include, but are not limited to, n-butyl lithium, s-butyllithium, t-butyllithium, diethylmagnesium, diethylzinc, triethylaluminum, trimethylaluminum, triisobutylalumium, and mixtures thereof.

Preferably, the metal alkyl is selected from the group consisting of non-hydrolyzed, i.e., not pre-contacted with water, alkylaluminum compounds, derivatives of alkylaluminum compounds, halogenated alkylaluminum compounds, and mixtures thereof for improved product selectivity, as well as improved catalyst system reactivity, activity, and/or productivity. Exemplary compounds include, but are not limited to, triethylaluminum, tripropylaluminum, tributylaluminum, diethylaluminum chloride, diethylaluminum bromide, diethylaluminum ethoxide, ethylaluminum sesquichloride, and mixtures thereof for best catalyst system activity and product selectivity. The most preferred alkylaluminum compound is triethylaluminum, for best results in catalyst system activity and product selectivity.

Most preferably, the metal alkyl is a non-hydrolyzed alkylaluminum compound, expressed by the general formula $AlR_3$, $AlR_2X$, $AlRX_2$, $AlR_2OR$, and/or $Al_2R_3X_3$, wherein R is an alkyl group and X is a halogen atom. Exemplary compounds include, but are not limited to, triethylaluminum, tripropylaluminum, tributylaluminum, diethylaluminumchloride, diethylaluminumbromide, diethylaluminumethoxide, diethylaluminum phenoxide, ethylaluminummethoxy-chloride, and/or ethylaluminum sesquichloride. Preferably, the metal alkyl is a trialkylaluminum compound, $AlR_3$, and the most preferred trialkylaluminum compound is triethylaluminum, for reasons given above.

Usually, contacting and/or reacting of the chromium source, pyrrole-containing compound and a metal alkyl is done in an unsaturated hydrocarbon. The unsaturated hydrocarbon can be any aromatic or aliphatic hydrocarbon, in a gas, liquid or solid state. Preferably, to effect thorough contacting of the inorganic oxide, chromium source, pyrrole-containing compound, and metal alkyl, the unsaturated hydrocarbon will be in a liquid state. The unsaturated hydrocarbon can have any number of carbon atoms per molecule. Usually, the unsaturated hydrocarbon will comprise less than about 70 carbon atoms per molecule, and preferably, less than about 20 carbon atoms per molecule, due to commercial availability and ease of use. Exemplary unsaturated, aliphatic hydrocarbon compounds include, but are not limited to, ethylene, 1-hexene, 1,3-butadiene, and mixtures thereof. The most preferred unsaturated aliphatic hydrocarbon compound is ethylene, because of elimination of catalyst system preparation steps and ethylene can be a reactant. Exemplary unsaturated aromatic hydrocarbons include, but are not limited to, toluene, benzene, xylene, mesitylene, hexamethylbenzene, and mixtures thereof. Unsaturated, aromatic hydrocarbons are preferred in order to improve catalyst system stability, as well as produce a highly active and selective catalyst system. The most preferred unsaturated aromatic hydrocarbon is toluene.

It should be recognized, however, that the reaction mixture comprising a chromium source, pyrrole-containing compound, metal alkyl and unsaturated hydrocarbon can contain additional components which do not adversely affect and can enhance the resultant catalyst system, such as, for example, halides.

Catalyst Systems

Catalyst systems prepared in accordance with this invention can be used olefin polymerization. Catalyst systems comprise a chromium source, pyrrole-containing compound, an unsaturated hydrocarbon and a metal alkyl, all supported on a support, as disclosed earlier. In accordance with a second embodiment of this invention, these supported catalyst systems, which have not been activated in an oxygen-containing ambient, can have usefulness for other purposes. As used in this disclosure, an unactivated, supported catalyst system which has been used at least once, for another purpose, can be considered a waste chromium-containing catalyst system.

The amount of chromium source, pyrrole-containing compound, unsaturated hydrocarbon, metal alkyl, and support used to prepare a polymerization catalyst system can be any amount sufficient that, after activation and when combined with one or more olefins, polymerization occurs. Generally, the chromium component is used in an amount sufficient to give about 0.05 to about 5, preferably 0.1 to 2 weight percent chromium, based on the total weight of the chromium and support after activation. If necessary, chromium compound can be added to a support, or a previously chromium compound impregnated support, in succession. Usually, successive impregnation is not preferred, but can be necessary if a weak, i.e., dilute, chromium compound solution is used for impregnation.

The catalyst system components can be combined in any manner under conditions suitable to form an effective catalyst system. The preparation of the catalyst system preferably occurs in the absence of oxygen, which can deactivate the catalyst system, and under anhydrous conditions, i.e., in the initial absence of water. Therefore, a dry, inert atmosphere, such as, for example, nitrogen and/or argon, is most preferred.

The reaction pressure, during catalyst system preparation, can be any pressure which does not adversely affect the reaction. Generally, pressure within the range of from about atmospheric pressure to about three atmospheres are acceptable. For ease of operation, atmospheric pressure is generally employed.

The reaction temperature, during catalyst system preparation, can be any temperature. In order to effectuate a more efficient reaction, temperatures which maintain the reaction mixture in a liquid state, for reasons given above, are preferred.

The reaction time, during catalyst system preparation, can be any amount of time necessary for the reaction to occur. The reaction can be considered a dissolution process; any amount of time wherein substantially all soluble reactants can be dissolved is sufficient. Depending on the reactants, as well as the reaction temperature and pressure, reaction time can vary. Times of less than about 1 day can be sufficient. Usually, reaction time is less than about 60 minutes. Under optimum conditions, the reaction time can be within the range of from about 1 second to about 15 minutes. Longer times usually provide no additional benefit and shorter times may not allow sufficient time for complete reaction.

A solid catalyst system can be recovered according to any method known in the art. Recovery of a solid catalyst system can help reduce, or eliminate, the presence of any unsaturated hydrocarbon(s) which are not polymerization reactants and can be polymerization reaction poisons. For example, aromatic hydrocarbons, such as, for example, excess toluene, can poison a polymerization reaction.

Preferably, a solid catalyst system is recovered by filtration and subsequently washed with a sufficient amount of a saturated hydrocarbon. Saturated hydrocarbons useful for washing include, but are not limited to, aliphatic hydrocarbons having from about 1 to about 20 carbon atoms per molecule. Preferably, that aliphatic hydrocarbon is a linear aliphatic hydrocarbon and has from 1 to 15 carbon atoms per molecule. Exemplary saturated hydrocarbons include, but are not limited to, methane, propane, butane, pentane, hexane, octane, and/or 1-decene.

After filtration, the polymerization catalyst system, preferably, can be washed with a saturated hydrocarbon wash solution until a clear filtrate is observed. After washing, the solid catalyst system can be stored under a dry, inert atmosphere until ready for activation. The resulting chromium component on the support is then subjected to activation in an oxygen-containing ambient in the manner conventionally used in the art. Because of economy, the preferred oxygen-containing ambient is air, preferably dry air. The activation is carried out at an elevated temperature for about one half to about 50 hours, preferably 2 to 10 hours at a temperature within the range of 400° to 900° C. Under these conditions, at least a substantial portion of any chromium in a lower valent state is converted to the hexavalent form by this calcination procedure.

Optionally, the resulting calcined supported catalyst component is cooled and then subjected to at least partial reduction of the hexavalent chromium to a lower valent state prior to combining with the cocatalyst. The reducing agent must be carbon monoxide. The carbon monoxide can be employed at temperatures between 300° to 500° C. although it is more often employed at temperatures in the range of about 350° to 450° C. The partial pressure of the reducing gas in the reduction operation can be varied from sub-atmospheric pressures to relatively high pressures, but the simplest reducing operation is to utilize essentially pure carbon monoxide at about atmospheric pressure.

The reduction time can vary from a few minutes to several hours or more. The extent of reduction can be followed by visual inspection of catalyst color. The color of the initial activated catalyst is generally orange, indicating the presence of hexavalent chromium. The color of the reduced catalyst employed in the invention is blue, indicating that all or substantially all of the initial hexavalent chromium has been reduced to lower oxidation states, generally the divalent state.

The course of the reduction of the air-activated orange catalyst with carbon monoxide can be determined exactly by pulse titration. A known amount of carbon monoxide is added per pulse and the amount of evolved carbon dioxide is measured. When reduction is complete, only carbon monoxide will be present and the catalyst is blue in color. The reduced blue catalyst can be titrated with pulses of oxygen to convert the catalyst to the original orange color. When oxidation is complete, oxygen will be evident in the offgas.

After reduction, the reduced supported catalyst component is cooled to about room temperature, e.g. 25° C. in an inert atmosphere such as argon or nitrogen to flush out the carbon monoxide. After this flushing treatment, the catalyst is kept away from contact with either carbon monoxide or oxygen.

Cocatalysts

Catalyst systems of this invention can be used in conjunction with a cocatalyst if desired. Suitable Cocatalysts include, but are not limited to, aluminum and boron alkyls, which if used, can increase the melt flow characteristics of the resultant polymer. The most preferred boron compounds are trihydrocarbyl boron compounds, particularly tri-n-butylborane, tripropylborane, and triethylborane (TEB). Other suitable boron compounds include trialkyl boron compounds broadly, particularly those having alkyl groups of about 1 to about 12 carbon atoms, preferably, about 2 to about 5 carbon atoms; triaryl boron compounds such as triphenylborane; boron alkoxides such as $B(C_2H_5)_2OC_2H_5$; and halogenated alkyl boron compounds such as $BC_2H_5Cl_2$. Suitable aluminum alkyls include $R'_3Al, R'_2AlX$ and $R'AlX_2$ compounds where $R'$ is a hydrocarbyl radical with about 1 to about 12 carbon atoms and X is a halogen, preferably chlorine. Triethylaluminum and diethylaluminum chloride are particularly suitable.

The cocatalyst is used in an amount within the range of about 0.1 to about 1000, preferably about 0.25 to about 100, parts per million based on the solvent or diluent in systems employing a solvent or diluent and based on total reactor contents in systems not employing a solvent or diluent. Based on the chromium in the catalyst, they are used in an amount so as to give about 0.05 to about 1000, preferably about 0.05 to about 300 times as much aluminum by weight as chromium by weight. Based on atoms of boron per atoms of chromium, the amount of cocatalyst used will give about 0.5 to about 500, preferably about 1 to about 100, atoms of boron (or aluminum) per atom of chromium.

The cocatalyst can be either premixed with the catalyst system or introduced into the reactor as a separate stream, the latter being the preferred procedure for ease of catalyst system preparation and handling.

Of course, the final catalyst can be used with, or contain, other ingredients which do not adversely affect its performance, as for example other cocatalyst, antistatic aids in the polymerization zone, and other conventional ingredients.

Reactants

Reactants applicable for use with the catalyst systems and processes of this invention are olefinic compounds which can polymerize, i.e., react, with other olefinic compounds. The catalyst systems of the invention can be used to polymerize at least one mono-1-olefin having 2 to about 10 carbon atoms per molecule. Exemplary compounds include, but are not limited to, ethylene, propylene, 1-butene, 1-pentene, 1-hexene, and 1-octene.

This invention is of particular applicability in producing ethylene homopolymers and copolymers from mixtures of ethylene and about 0.5 to about 20 mole percent of one or more comonomers selected from 1-olefins having about 3 to about 20 carbon atoms per molecule. Exemplary comonomers include, but are not limited to, aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably about 97 to about 99.6 weight percent polymerized ethylene units. Propylene, 1-butene, 1-pentene, 1-hexene and 1-octene are especially preferred comonomers for use with ethylene.

The presence of comonomer has a tendency to increase melt flow more than would be expected. Hence, the use of only a small amount of comonomer, say 0.001 to 0.3, preferably 0.01 to 0.1, mole percent in the feed can be used to give a polymer which is essentially a homopolymer but which has increased melt flow.

Reaction Conditions

The polymers can be prepared from catalyst systems of this invention by solution polymerization, slurry polymerization, and gas phase polymerization techniques using conventional equipment and contacting processes. Contacting of the monomer or monomers with the catalyst system can be effected by any manner known in the art of solid catalysts. One convenient method is to suspend the catalyst system in the organic medium and to agitate the mixture to maintain the catalyst system in suspension throughout the polymerization process. Other known contacting methods such as fluidized bed, gravitating bed, and fixed bed can also be employed. Catalyst systems of this invention are especially useful in a particle form process as disclosed in Witt, U.S. Pat. No. 3,724,063, the disclosure of which is hereby incorporated by reference.

The catalyst systems of this invention are particularly suitable for use in slurry polymerizations. The slurry process is generally carried out in an inert diluent (medium), such as paraffin, cycloparaffin or aromatic hydrocarbon. For predominantly ethylene polymers, temperatures within a range of about 66° to about 110° C. are employed.

The medium and temperature are selected such that the polymer is produced as solid particles and is recovered in that form. Pressures in the particle form process can vary from about 110 to about 700 psia (0.76–4.8 MPa) or higher. The catalyst system is kept in suspension and is contacted with the amount or monomers at sufficient pressure to maintain the medium and at least a portion of the monomer or monomers in the liquid phase.

Generally in slurry polymerization of ethylene homopolymer and predominantly ethylene copolymer systems, the feasible temperature range is about 93° to about 110° C. Commercial systems are operated as close to the maximum as possible, i.e., about 107°±3° C., in order to obtain the highest possible melt index without the polymer going into solution. Depending on the choice of catalyst system support, some catalyst systems of this invention allow operating at the low end to this range, i.e., about 96±3° C., in systems normally employing a temperature of about 107° C. The lower temperature gives a relatively higher monomer partial pressure, thus giving higher activity.

Hydrogen can be added to the reactor to control the molecular weight of the polymer. Generally, hydrogen concentration is inversely proportional to the molecular weight of the polymer, i.e., increasing hydrogen pressure decreases the polymer molecular weight. In prior art, hydrogen is generally used at pressures up to about 120 psig (0.8 MPa), preferably within the range of about 20 to about 70 psig (about 0.01 to about 0.48 MPa). Similar amounts can be used in accordance with this invention although smaller amounts are sometimes preferred because of the sensitivity of this catalyst system to the effects of hydrogen.

EXAMPLES

In the following Examples, all catalyst systems were prepared under dry nitrogen, at ambient temperature and pressure, unless otherwise indicated. Catalyst supports were either aluminophosphate, prepared in accordance with U.S. Pat. No. 4,364,855, herein incorporated by reference, activated at 700° C., with a P/Al molar ratio of 0.4; or a silica-titania cogel, prepared in accordance with U.S. Pat. No. 3,887,494, herein incorporated by reference, dried at 200° C. under nitrogen, prior to use.

The catalyst system used in Run 101 was prepared by combining 10.1 g aluminophosphate, 37 ml of 1M triethylaluminum (TEA) in hexanes, and 150 ml toluene. The slurry was stirred for about 24 hours. Then, 1.1 g of a chromium pyrrolide complex ([Na(DME)$_2$][CrCl(C$_4$H$_5$N)$_3$(DME)]) (CrPy$_3$), wherein DME is dimethoxyethane, was added; the slurry was stirred for about 24 hours and filtered. The solid was washed, first with toluene and then with pentane until a clear filtrate was observed. The solid product was dried and then calcined, or activated, in air at 850° C. for 3 hours.

The catalyst system used in Runs 102 and 103 was prepared by combining 2.0 g aluminophosphate, 6 ml of 1.9M TEA in toluene, 15 ml toluene and 0.202 g CrPy$_3$. The slurry was stirred for about 48 hours. The slurry was filtered and the solid was washed twice with toluene and then twice with pentane until a clear filtrate was observed. All of the filtrate, which was a dark brown color, was saved and can be referred to as a typical solution of a waste chromium compound.

Then, 5.1 g of silica-titania cogel was added to the waste chromium compound solution and the slurry was allowed to stand for about 16 hours. The solution decolorized. The slurry was filtered and the solid was washed twice with toluene and then twice with pentane until a clear filtrate was observed. The final solid product was dried and calcined, or activated, in air at 850° C. for 3 hours. The calcined, solid product was orange in color.

The polymerization runs were carried out in a two liter reactor under slurry (particle form) conditions. The diluent was isobutane and reactor temperature was 90° C. Reactor pressure was held at 550 psig during the polymerization, with ethylene being fed on demand.

The actual charging of the reactor was accomplished by purging the reactor at 100° C. with a stream of nitrogen for at least 15 minutes, the reactor temperature was lowered to 90° C. and a preweighed amount of supported catalyst system and 0.5 ml of a one (1) weight percent, based on the amount of isobutane, triethylboron (TEB) cocatalyst were charged against a slight countercurrent of nitrogen. One liter of isobutane was then charged to the reactor and finally the reactor pressurized with ethylene. The reaction time was one hour.

The ethylene consumed was determined using a pre-calibrated ethylene flow meter. Solid products were obtained by venting the reactor to atmosphere and collecting the solid material. The solids were dried at 100° C. in a vacuum oven and weighed. The yield of solid product was obtained by weighing the combined solid and catalyst residues and subtracting from this the pre-weighed catalyst charge.

Polymer analyses were conducted according to the following procedures:

Density (g/cc): ASTM D1505-68 and ASTM D1928, Condition C. Determined on a compression molded sample, cooled at about 15° C. per minute, and conditioned at room temperature for about 40 hours.

High Load Melt Index (HLMI)(g/10 min): ASTM D1238. Determined at 190° C. with a 21,600 gram weight.

Melt Index (MI)(g/10 min): ASTM D1238. Determined at 190° C. with a 2,160 gram weight.

The heterogeneity index (Mw/Mn), which is the weight average molecular weight (Mw) divided by the number average molecular weight (Mn), was determined using data collected by gel permeation chromatography. This gel permeation chromatography was accomplished with a Waters C chromatograph at 140° C. with 1,2,4 -trichlorobenzene as a solvent.

The results of the polymerization reactions are in Table I, below.

TABLE I

|  | Run 101 | Run 102 | Run 103 |
|---|---|---|---|
| Catalyst Charge, g | 0.1215 | 0.0702 | 0.1490 |
| Solid product Yield, g | 196.7 | 47 | 288 |
| Activity, g/polymer/ g catalyst/hr | 1590 | 1340 | 2000 |
| Density, g/cc | 0.958 | ND | 0.964 |
| MI, g/10 min | 0 | ND | 0.77 |
| HLMI, g/10 min | 0.17 | ND | 49.5 |
| Weight Avg. Molecular Weight, Mw | 414,000 | ND | 171,800 |
| Number Avg. Molecular Weight, Mn | 11,400 | ND | 11,300 |
| Heterogeneity Index, Mw/Mn | 36.2 | ND | 15.2 | a) ND means not determined.

The results in Table I show that waste-chromium-containing solution comprising a chromium-containing compound, a pyrrole-containing compound and an unsaturated hydrocarbon, and a metal alkyl can be supported on an inorganic oxide and activated to form an active polymerization catalyst system.

While this invention has been described in detail for the purpose of illustration, it is not to be construed as limited thereby but is intended to cover all changes and modifications within the spirit and scope thereof.

That which is claimed is:

1. A process to prepare a catalyst system composition comprising:
   a) contacting a waste chromium compound, which has been previously used for another purpose and subsequently recovered, wherein said waste chromium compound comprises a chromium-containing compound, a pyrrole-containing compound, an unsaturated hydrocarbon; and a non-hydrolyzed aluminum alkyl; and a support selected from the group consisting of zeolites, inorganic oxides, and mixtures thereof;
   b) recovering a solid product;
   c) activating said solid product in the presence of oxygen at a temperature within a range of about 400° to about 900° C.; and
   d) recovering a solid catalyst system.

2. A process according to claim 1 wherein said waste chromium compound is a filtrate recovered following a process to prepare a supported chromium pyrrolide-based catalyst system.

3. A process according to claim 1 wherein said waste chromium compound is a previously used, uncalcined inorganic oxide supported chromium pyrrolide-based catalyst system.

4. A process according to claim 1 wherein said chromium compound is selected from the group consisting of chromium(II)-compounds, chromium(III)-compounds, and mixtures thereof.

5. A process according to claim 4 wherein said chromium compound is a chromium(II)-compound selected from the group consisting of chromous bromide, chromous fluoride, chromous chloride, chromium(II) bis(2-ethylhexanoate), chromium(II) acetate, chromium(II) butyrate, chromium(II) neopentanoate, chromium(II) laurate, chromium(II) stearate, chromium(II) oxalate, chromium(II) pyrrolides, and mixtures of two or more thereof.

6. A process according to claim 4 wherein said chromium compound is a chromium (III) compound is selected from the group consisting of chromium(III) 2,2,6,6,-tetramethylheptanedionate [Cr(TMHD)$_3$], chromium(III) 2-ethylhexanoate [Cr(EH)$_3$], chromium(III) naphthenate [Cr(Np)$_3$], chromium(III) chloride, chromium(III) tris(2-ethylhexanoate), chromic bromide, chromic chloride, chromic fluoride, chromium(III) oxy-2-ethylhexanoate, chromium(III) dichloroethylhexanoate, chromium(III) acetylacetonate, chromium(III) acetate, chromium(III) butyrate, chromium(Ill) neopentanoate, chromium(III) laurate, chromium(III) stearate, chromium (III) pyrrolides, chromium(III) oxalate, and mixtures of two or more thereof.

7. A process according to claim 1 wherein said pyrrole-containing compound has from about 1 to about 20 carbon atoms per molecule.

8. A process according to claim 7 wherein said pyrrole-containing compound is selected from the group consisting of hydrogen pyrrolide (pyrrole), lithium pyrrolide, sodium pyrrolide, potassium pyrrolide, cesium pyrrolide, salts of substituted pyrrolides, and mixtures of two or more thereof.

9. A process according to claim 8 wherein said pyrrole-containing compound is a salt of a substituted pyrrolide and is selected from the group consisting of pyrrole-2-carboyxlic acid, 2-acetylpyrrole, pyrrole-2-carboxaldehyde, tetrahydroindole, 2,5-dimethylpyrrole, 2,4-dimethyl-3-ethylpyrrole, 3-acetyl-2,4-dimethylpyrrole, ethyl-2,4-dimethyl-5-(ethoxycarbonyl)-3-pyrrolepropionate, ethyl-3,5-dimethyl-2-pyrrolecarboxylate, and mixtures of two or more thereof.

10. A process according to claim 1 wherein said unsaturated hydrocarbon has less about 70 carbon atoms per molecule, and is selected from the group consisting of unsaturated aromatic hydrocarbons, unsaturated aliphatic hydrocarbons, and mixtures thereof.

11. A process according to claim 10 wherein said unsaturated hydrocarbon is an unsaturated aromatic hydrocarbon selected from the group consisting of toluene, benzene, xylene, mesitylene, hexamethylbenzene, and mixtures of two or more thereof.

12. A process according to claim 11 wherein said unsaturated aromatic hydrocarbon is toluene.

13. A process according to claim 10 wherein said unsaturated hydrocarbon is an aliphatic hydrocarbon selected from the group consisting of ethylene, 1-hexene, 1,3-butadiene and mixtures of two or more thereof.

14. A process according to claim 13 wherein said unsaturated aliphatic hydrocarbon is ethylene.

15. A process according to claim 1 wherein said inorganic oxide is selected from the group consisting of silica, silica-alumina, alumina, fluorided, alumina, silated alumina, thoria, aluminophosphate, aluminum phosphate, phosphated silica, phosphated alumina, silica-titania, coprecipitated silica/titania, fluorided/silated alumina, and mixtures thereof.

16. A process according to claim 15 wherein said inorganic oxide support is aluminophosphate.

17. A process according to claim 1 wherein said non-hydrolyzed aluminum alkyl is selected from the group consisting of triethylaluminum, tripropylaluminum, tributylaluminum, diethylaluminumchloride, diethylaluminumbromide, diethylaluminumethoxide, diethylaluminum phenoxide, ethylaluminumethoxy-chloride, ethylaluminum sesquichloride, and mixtures of two or more thereof.

18. A process according to claim 17 wherein said non-hydrolyzed alkyl aluminum compound is triethylaluminum.

19. A process to prepare a catalyst system composition comprising:
a) contacting a waste chromium compound, which has been previously used for another purpose and subsequently recovered, wherein the waste chromium compound is a chromium pyrrolide comprising 2,5-dimethylpyrrole; toluene; and non-hydrolyzed triethylaluminum; and an aluminophosphate support;
b) recovering a solid product;
c) activating said solid product in the presence of oxygen at a temperature within a range of about 400° C. to about 900° C.; and
d) recovering a solid catalyst system.

* * * * *

UNITED STATES PATENT AND TRADEMARK OFFICE
CERTIFICATE OF CORRECTION

PATENT NO. : 5,399,539
DATED : March 21, 1995
INVENTOR(S) : William K. Reagen et al It is certified that error appears in the above-indentified patent and that said Letters Patent is hereby corrected as shown below:

Column 11, claim 6, line 32, delete "chromium(l11)" and insert --- chromium(III) ---.

Signed and Sealed this

Seventeenth Day of October, 1995

Attest:

BRUCE LEHMAN

Attesting Officer         Commissioner of Patents and Trademarks